United States Patent
Kotani et al.

(10) Patent No.: US 6,630,816 B2
(45) Date of Patent: Oct. 7, 2003

(54) GRID-TYPE ENGINE GENERATOR APPARATUS FOR CONNECTING AN OUTPUT OF AN ENGINE-DRIVEN GENERATOR TO A POWER NETWORK

(75) Inventors: Yoshiaki Kotani, Saitama (JP); Tomoki Fukushima, Saitama (JP); Kenji Kamimura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/938,732

(22) Filed: Aug. 27, 2001

(65) Prior Publication Data

US 2002/0024325 A1 Feb. 28, 2002

(30) Foreign Application Priority Data

Aug. 28, 2000 (JP) ......................... 2000-257702

(51) Int. Cl.⁷ .......................... H02H 7/06; H02P 11/00; H02P 9/00
(52) U.S. Cl. ........................ 322/37; 322/22; 322/23; 322/17
(58) Field of Search ................... 322/37, 22–23, 322/17

(56) References Cited

U.S. PATENT DOCUMENTS

| | | | | | |
|---|---|---|---|---|---|
| 3,975,646 | A | * | 8/1976 | Kilgore et al. ............... 307/21 |
| 4,380,909 | A | * | 4/1983 | Sung ........................... 62/79 |
| 4,489,690 | A | * | 12/1984 | Burkel et al. ............... 123/419 |
| 4,657,290 | A | * | 4/1987 | Linden .......................... 290/2 |
| 4,736,111 | A | * | 4/1988 | Linden .......................... 290/2 |
| 4,752,697 | A | * | 6/1988 | Lyons et al. .................... 290/2 |
| 4,873,840 | A | * | 10/1989 | Gilliusson ................. 62/238.6 |
| 4,896,639 | A | * | 1/1990 | Holmes ...................... 123/419 |
| 5,060,474 | A | * | 10/1991 | Aramaki ..................... 60/277 |
| 5,063,901 | A | * | 11/1991 | Kaneyasu et al. ........... 123/419 |
| 5,129,379 | A | * | 7/1992 | Kaneyasu et al. ........... 123/436 |
| 5,140,810 | A | * | 8/1992 | Kuroda ....................... 60/274 |
| 5,191,762 | A | * | 3/1993 | Kuroda et al. ................ 60/276 |
| 5,223,826 | A | * | 6/1993 | Amou et al. ................. 340/3.2 |
| 5,333,446 | A | * | 8/1994 | Itoh .............................. 60/274 |
| 5,341,642 | A | * | 8/1994 | Kurihara et al. .............. 60/276 |
| 5,617,722 | A | * | 4/1997 | Takaku ........................ 60/277 |
| 5,731,688 | A | * | 3/1998 | Thomson ..................... 322/22 |
| 5,734,255 | A | * | 3/1998 | Thompson et al. ............ 322/7 |
| 5,973,481 | A | * | 10/1999 | Thompson et al. ............ 322/7 |
| 6,131,538 | A | * | 10/2000 | Kanai ............................ 123/2 |
| 6,219,623 | B1 | * | 4/2001 | Wills .......................... 702/60 |
| 6,230,480 | B1 | * | 5/2001 | Rollins, III ............... 60/39.182 |
| 6,290,142 | B1 | | 9/2001 | Togawa et al. ............ 237/12.1 |
| 6,359,439 | B1 | * | 3/2002 | Crecelius et al. ............ 324/391 |
| 6,498,462 | B2 | * | 12/2002 | Ballantine et al. ............. 322/8 |
| 6,512,966 | B2 | * | 1/2003 | Lof et al. .................... 700/291 |
| 6,525,431 | B1 | * | 2/2003 | Clucas et al. ................. 290/2 |
| 6,536,215 | B1 | * | 3/2003 | Vikstrom ................... 60/641.1 |

FOREIGN PATENT DOCUMENTS

| | | |
|---|---|---|
| JP | 8-182192 | 7/1996 |
| JP | 2000-297700 | 10/2000 |

* cited by examiner

Primary Examiner—Nestor Ramirez
Assistant Examiner—Pedro J. Cuevas
(74) Attorney, Agent, or Firm—Armstrong, Westerman & Hattori, LLP

(57) ABSTRACT

A grid-type engine generator apparatus which can prevent reduction in the operational efficiency due to the stop motion of an engine at the cancellation of the interconnection and minimize loads exerted on the startup device for the engine. A network protector is provided for generating a fault signal when detecting a fault on the network source. Upon receiving the fault signal, an interconnection relay is opened to cancel the interconnection and simultaneously, a timer is started. The cancellation permits the engine to run with no load. When the fault signal is maintained until the setting duration of the timer is timed up, a time-out signal is released to stop the engine. On the other hand, when the fault signal is eliminated by canceling the cause of the fault before the setting duration of the timer is passed, the interconnection relay is closed to establish the interconnection again and the timer is reset.

3 Claims, 7 Drawing Sheets

GRID-TYPE ENGINE GENERATOR APPARATUS FOR CONNECTING AN OUTPUT OF AN ENGINE-DRIVEN GENERATOR TO A POWER NETWORK

BACKGROUND OF THE INVENTION

1. Field of the Invention

The present invention relates to an engine generator apparatus and a co generation system and more particularly, to an engine generator apparatus interconnecting with an electric power network or grid for private use generator or a small-sized cogeneration facility and a cogeneration system including the engine generator apparatus.

2. Description of the Related Art

Generator apparatuses for private use have widely been provided for emergency use in case of blackout or power failure. Recently, private use cogeneration type generator apparatuses which can be interconnected with electric power networks for improvement of the efficiency of operation are getting popular. Such a cogeneration type private use generator apparatus comprises a small generator driven by a gasoline engine or a gas engine fueled with gas fuel such as town gas.

For smooth interconnection with an electric power network, the cogeneration type generator apparatus needs to comply with the guideline for technical requirements for interconnection (issued by the Ministry of Trade) which stipulates technical standards including a range of outputs of applicable power networks and protections for the power network in case of a ground fault or short-circuit. It is necessary to cancel the interconnection with the network when the operation fails to comply with the requirements of the guideline as is regarded as a fault. As the operation has been reset to comply with the requirements of the guideline, the interconnection to the power network can be re-established.

The cogeneration system driven by a gasoline engine or a gas engine includes a controller unit for purifying the exhaust gas. More specifically, an oxygen density sensor is provided across the passage of an exhaust gas from the engine for measuring the density of oxygen in the exhaust gas which is then used for controlling the air-fuel ratio in a mixture gas supplied to the engine to theoretical air-fuel ratio for complete combustion.

When the cogeneration system having such an exhaust gas purifying apparatus encounters a fault during its operation, it cancels the interconnection with the power network and then stops the engine, thereby producing the following drawback. For normal operation, the oxygen density sensor needs to have a temperature of substantially 400° C. At every re-start operation of the engine, a warming up for raising the temperature of the oxygen density sensor from a lower level to the operable level where the sensor is activated is required. The frequent warming up operation causes a declination in the operational efficiency. Particularly, as the engine is stopped upon temporary cancellation of the interconnection with the re-interconnection within a short interval of time, the operational efficiency will significantly be declined. Also, if a protection scheme is switched on to stop the engine at every cancellation of the interconnection, it may exert unwanted loads on the startup device or other components.

SUMMARY OF THE INVENTION

The present invention is developed in view of the above drawback and its object is to provide an engine generator apparatus and a cogeneration system which can inhibit declination in the operational efficiency due to the engine stop at the cancellation of the interconnection and reduces loads exerted on the engine startup device.

An engine generator apparatus according to the present invention is provided for interconnecting an output of a generator driven by an engine with a power network, comprising, an oxygen density sensor provided on the engine for controlling the air-fuel ratio based on its output, a means for interconnecting the output of the power generator with the power network, when the oxygen density sensor becomes its activated state, a fault detecting means for detecting a fault in the interconnection with the power network, a means for canceling the interconnection with the power network when the fault detecting means detects a fault, and resuming the interconnection with the power network when the fault is removed; and a means for stopping the engine when the interconnection is canceled for a predetermined length of time due to the fault detection.

According to the above arrangement, the engine is not stopped but operated with no load even if the interconnection with the power network is canceled, provided that the interval from the cancellation to the re-interconnection is not longer than a particular length of time. The engine stop in response to every cancellation of the interconnection can successfully be eliminated. As a result, a warming up for activating the oxygen density sensor can be carried out at a lower frequency and the exertion of undesired loads on the startup device for the engine can be avoided.

A cogeneration system according to the present invention includes an waste heat utilizing unit for utilizing waste heat produced by the operation of the engine generator apparatus and is arranged wherein the engine is started in response to a heat request received from the waste heat utilizing unit. As the engine is started by the heat request from the waste heat utilizing unit, the waste heat produced during the period before the activation of the oxygen density sensor is completed can be utilized at effectiveness.

DETAILED DESCRIPTION OF THE PREFERRED EMBODIMENTS

Figure 1:
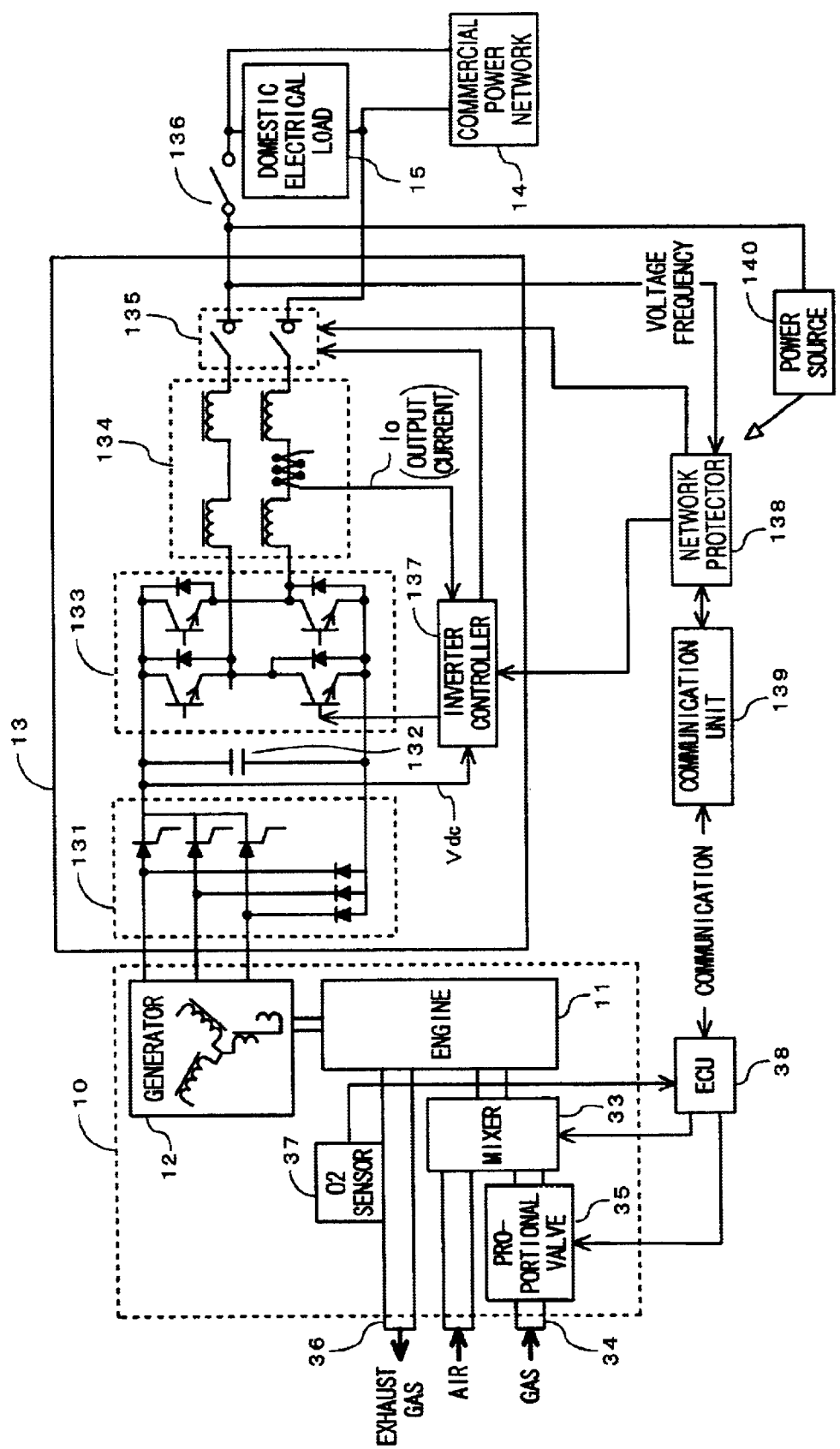
FIG. 1 is a block diagram of an engine generator apparatus illustrating one embodiment of the present invention.

One embodiment of the present invention will be described in more detail referring to the relevant drawings. FIG. 1 is a block diagram of the engine generator apparatus. As shown, an engine operated generator 10 comprises an engine 11 and a generator 12. The generator 12 is driven by the engine 11 for generating an alternating current output responding to the number of revolutions. The generator 12 comprises a rotor joined to the engine 11 and a stator on which three phase windings are wound. The output terminal of the three phase windings is connected with an inverter unit 13. The inverter unit 13 converts the alternating current output of the generator 12 into an alternating current of the quality equivalent (in voltage, frequency, noise, and other factors) to that of the commercial power supply, then the output is connected to the commercial power network as timed in phase with the same of the network.

More specifically, the inverter unit 13 comprises a converter 131 for converting the alternating current output of the generator 12 into a direct current, an inverter circuit 133 for converting the direct current received from the converter 131 into an alternating current with the frequency and the voltage of the commercial power network, a filter circuit 134, and a connector relay 135. The alternating current output of the inverter unit 13 is connected by the connector relay 135 and a main switch 136 to the commercial power network 14 and also to a domestic electrical load 15 (for example, in a private use power network).

Also, the inverter unit 13 includes an inverter controller 137 for switch controlling the FET of the inverter circuit 133. The inverter controller 137 are arranged responsive to an output current Io, an output voltage Vdc of the converter circuit 131, and a signal from a system protector 138 for controlling the switching action of the connector relay 135 as providing a function for protecting the inverter circuit 133.

The system protector 138 monitors the voltage and frequency of the output of the generator 12 and if the voltage or the frequency is different from the reference level or the failure of the power supply is occurred, generates and supplies an error signal to the inverter controller 137 which in turn open the connector relay 135 thus release the parallel operation to protect the network. Failure in the power supply may be judged from jumping in the phase of the network. Alternatively, while the inverter output is periodically shifted in the phase, the failure may be judged from a degree of phase shift. The inverter controller 137 includes a nonvolatile memory such as an EEPROM for storage of data of the failure and data of the (unusual) stop motion when the failure takes place in the inverter unit 13 or the commercial power network 14.

The connector relay 135 is closed to connect the inverter unit 13 for parallel operation and is opened to disconnect the inverter unit 13 for parallel off. In addition, the connector relay 135 serves as a disconnector for protection of the system and is opened instantly when the system has a fault. The switching action of the connector relay 135 is controlled by the inverter controller 137 and the system protector 138, either may be implemented by a microcomputer. The connector relay 135 remains opened (parallel operation is released) when the main switch 136 is disconnected.

An ECU 38 is provided for controlling the engine 11. When the connector relay 135 is kept opened at a predetermined length of time, the ECU 38 generates a stop signal to stop the engine 11. The ECU 38 hence includes a nonvolatile memory such as an EEPROM for storage of data of the fault or data of the stop motion by the fault as well as a display such as an LED for displaying the fault.

A communications unit 139 is provided between the ECU 38 and a combination (which may be referred to as an inverter side opposite to the ECU side) of the inverter controller 137 and the network protector 138 for communication of each state of both sides. A power source 140 is connected to the output terminal of the inverter unit 13 for supplying power to a drive source and a control source for both the engine generator 10 and the inverter unit 13.

The engine 11 is supplied with a mixture of air and gas fuel produced by a mixer 33. A proportional valve 35 is provided across a gas intake tube 34 and its opening can determine the air-fuel ratio. The mixture of air and gas fuel is combusted in the engine 11 and exhausted from an exhaust tube 36. An oxygen sensor 37 is provided across the exhaust tube 36. In response to the density of oxygen detected by the oxygen sensor 37, the ECU 38 drives the proportional valve 35 to set the air-fuel ratio to theoretical air-fuel ratio for complete combustion. Before the oxygen sensor 37 is activated, the engine 11 is driven in a lean-burning mode in order to minimize the discharge of toxic substances in accordance with the exhaust regulations.

Figure 2:
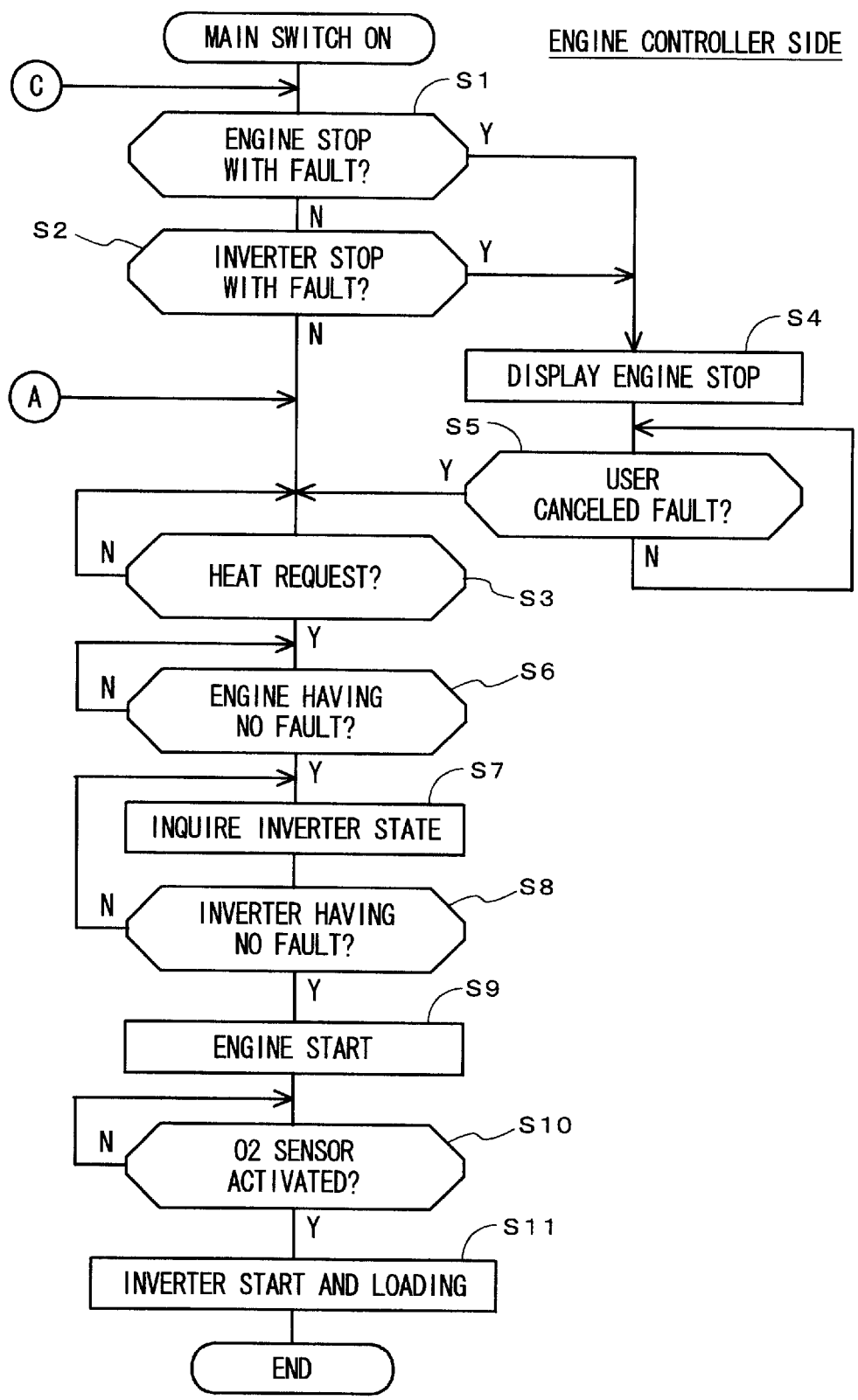
FIG. 2 is a flowchart showing the operation of an ECU at the start up.
Figure 3:
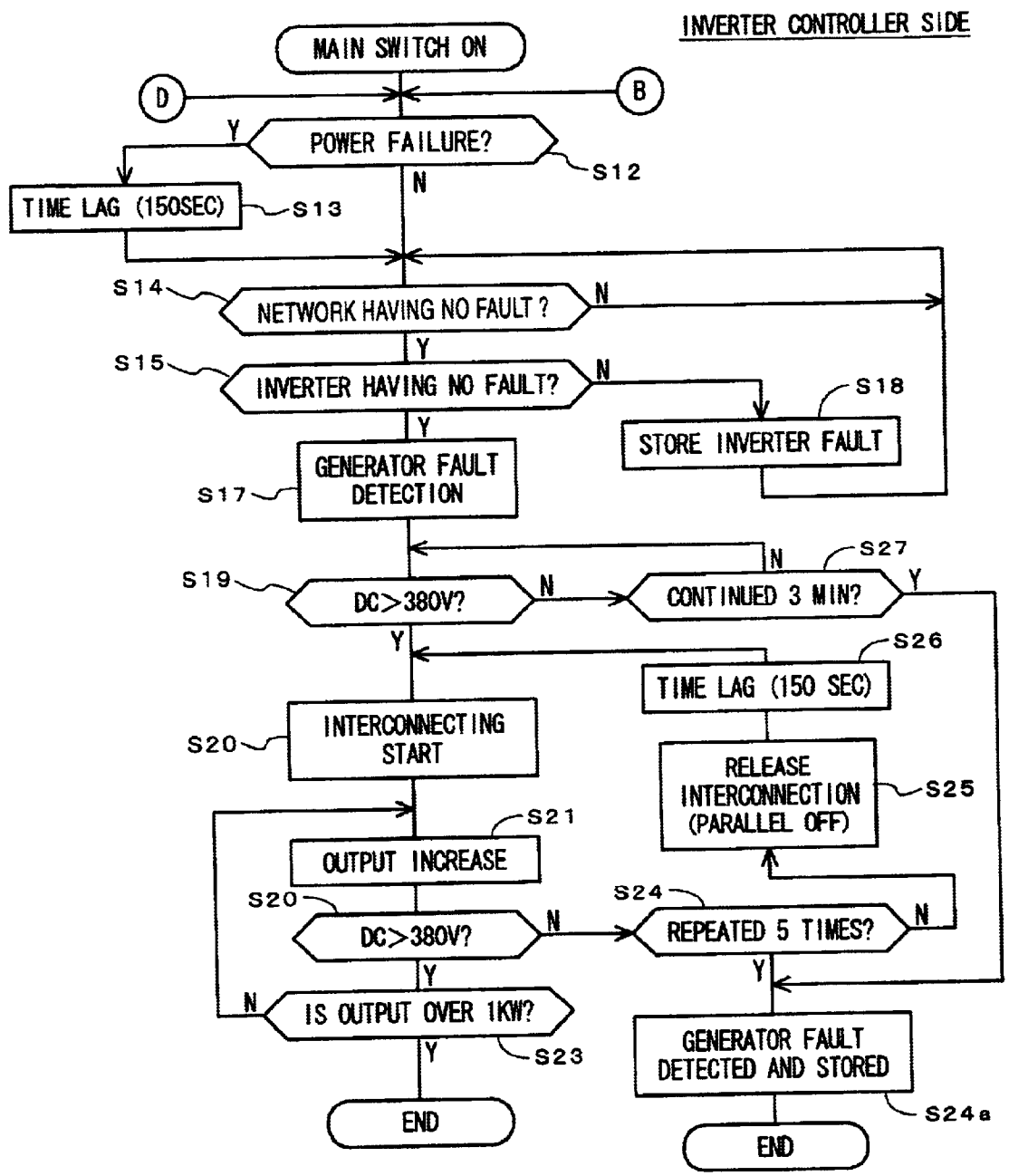
FIG. 3 is a flowchart showing the operation of an inverter controller at the start up.

FIGS. 2 and 3 are flowcharts showing the actions of the engine generator (or ECU) control side and the inverter control side of the system at the start up of the engine generator 10. The control action starts when the main switch 136 is turned on but the motion of the engine 11 is stopped by the occurrence of a fault.

The procedure of steps in the ECU 38 control side will now be explained referring to FIG. 2. At Step S1, it is judged from data stored in the nonvolatile memory whether or not the engine 11 is stopped by a fault on the engine 11. When the engine is stopped by a fault, the fault is displayed on the LED for notifying the user at Step S4. The data in the memory then remains unchanged. When the stop motion is not caused by the fault on the engine 11, the procedure advances to Step S2 for examining whether or not the stop motion is caused by a fault on the inverter unit 13. This examination is based on the data stored in the nonvolatile memory.

When the inverter unit 13 has a fault, the procedure jumps to Step S4. When the inverter unit 13 has no fault, the procedure goes to Step S3.

As it has been judged that the engine 11 is stopped by the fault on either the engine 11 or the inverter unit 13, the procedure goes to Step S4 for displaying the fault. This is followed by Step S5 where it is examined whether or not the engine stop is released by users handling. When the stop motion is canceled by the user ("yes" at Step S5), the procedure moves to Step S3. A switch (not shown) for canceling the stop motion by the fault may be provided independently of the main switch 136 in order to clear communication of the users mind for canceling the stop motion.

It is then examined at Step S3 whether or not a heat request is received or not from a controller (FIG. 5) for detecting the size of thermal load, i.e., the command for starting up the engine 11 is received. The thermal load in the form of a hot-water tank and the controller will be explained later in more detail.

When the heat request is received, the procedure goes to Step S6 where it is examined whether or not the engine 11 has a fault. If not, the procedure advances to Step S7 where the communication unit 139 is activated for inquiring of the inverter controller 137 about the state of the inverter unit 13. It is examined from a response from the inverter controller 137 at Step S8 whether or not the inverter unit 13 has a fault. If the inverter unit has no fault, the procedure goes to Step S9 for starting the engine 11. When the engine 11 is started up, its start is communicated to the inverter controller 137 through the communication unit 139.

It is then examined at Step S10 whether the oxygen sensor 37 is activated or not. When the sensor 37 is activated, a signal of "inverter start permission" is transmitted to the inverter controller 137 through the unit 139, and the inverter is started and apply the load (S11). The activation of the oxygen sensor 37 may be judged when a predetermined length of time has elapsed after the start up of the engine 11 or when the ambient temperature of the oxygen sensor 37 has increased to a predetermined level.

The process in the inverter controller 137 will now be explained referring to FIG. 3. As the main switch 136 has been turned on, it is examined from the data in the nonvolatile memory at Step S12 whether or not a power failure is detected. When the power failure is detected, the procedure goes to Step S13 for hesitation or time lag. After the hesitation of a predetermined length of time (e.g., 150 seconds), the procedure goes to Step S14. If no power failure is detected, the procedure jumps to Step S14 from Step S12.

The time lag at Step S13 has the following advantage. After a power failure occurs, its location may be identified through temporally re-energizing that is operated by the power company. Once a power failure occurs, it may be repeated after the re-energization. If so, when a power failure occurs with the main switch 136 being connected, the following re-energization starts up the generator apparatus. This may make the investigation for finding the cause of the power failure difficult. However, the hesitation or time lag of 150 seconds provides ease of the investigation.

It is then examined at Step S14 whether the power network has a fault. If the power network has not fault, the procedure goes to Step S15 where it is examined whether or not the inverter unit 13 now has a fault. If there is no fault, the procedure moves to Step S17 for starting the checkup of the generator 12. When the inverter unit 13 has a fault, the procedure goes to Step S18 for storing a memory with a data of "inverter fault" and returns back to Step S14.

When it is judged at Step S14 that the power network has a fault, the judgment at Step S14 is maintained until the fault on the power network is eliminated. The data in the nonvolatile memory indicative of the fault of the inverter unit 13 is cleared when the user cancels the usual state and the judgment at Step S5 is affirmative. As a result, the inverter fault is eliminated. This information about the inverter unit 13 is transferred to the ECU 38 side as a response to the requiring at Step S7.

It is then examined at Step S19 whether or not the direct current voltage Vdc after the rectification process exceeds a predetermined level (e.g., 380 V). When the voltage exceeds the predetermined level, the procedure advances to Step S20 where the connector relay 135 is closed by the signal of "inverter start permission" transmitted at Step S1 for starting the parallel operation with the commercial power network.

This is followed by Step S21 where the output of the inverter unit 13 is increased. It is examined at Step S22 whether or not the direct current voltage Vdc is kept exceeding the predetermined level (e.g. 380 V). If the Step S22 is affirmative, the procedure advances to Step S23 where it is examined whether the output reaches a rated level (e.g. 1 kW) or not. If the output is not reached the rated level, the procedure returns back to Step S21 for increasing the output of the inverter unit 13. When the output reaches its rated level, it is judged that the operation is normal and the procedure for examining the inverter fault at the start up is terminated. Because of Steps S21 to S23, the soft startup with gradually increasing the output can be performed.

On the other hand, when the direct current voltage Vdc is less than the predetermined level after increasing the output of the inverter unit 13 with the output which is lower than the rated level ("negative" at Step S23), the procedure moves from Step S22 to Step S24. It is examined at Step S24 whether or not the judgment that the direct current voltage Vdc is not higher than the predetermined level is repeated at a predetermined number of times (e.g., five times). If Step S24 is affirmative, it is judged that the generator 12 has a fault and the parallel operation with the commercial power network is canceled thus stopping the inverter controlling process. If it is judged "not" at Step S24, the procedure goes to Step S25 for canceling the parallel operation. After providing a time lag at Step S26 for the predetermined length of time (150 seconds), the procedure goes back to Step S20 for re-starting of the parallel operation. The procedure may be shifted from Step S26 to Step S19 instead of S20.

When it is judged negative at Step S19, the procedure goes to Step S27 where it is examined whether or not the direct current voltage Vdc is below the predetermined level throughout a predetermined length of time (e.g., three minutes). When the generator 12 has a fault, it is judged affirmative at Step S27 or affirmative at Step S24, and the procedure goes to Step S24a. At Step 524a, the nonvolatile memory is stored with the fault of the generator 12 and then the inverter control procedure is terminated.

Figure 4:
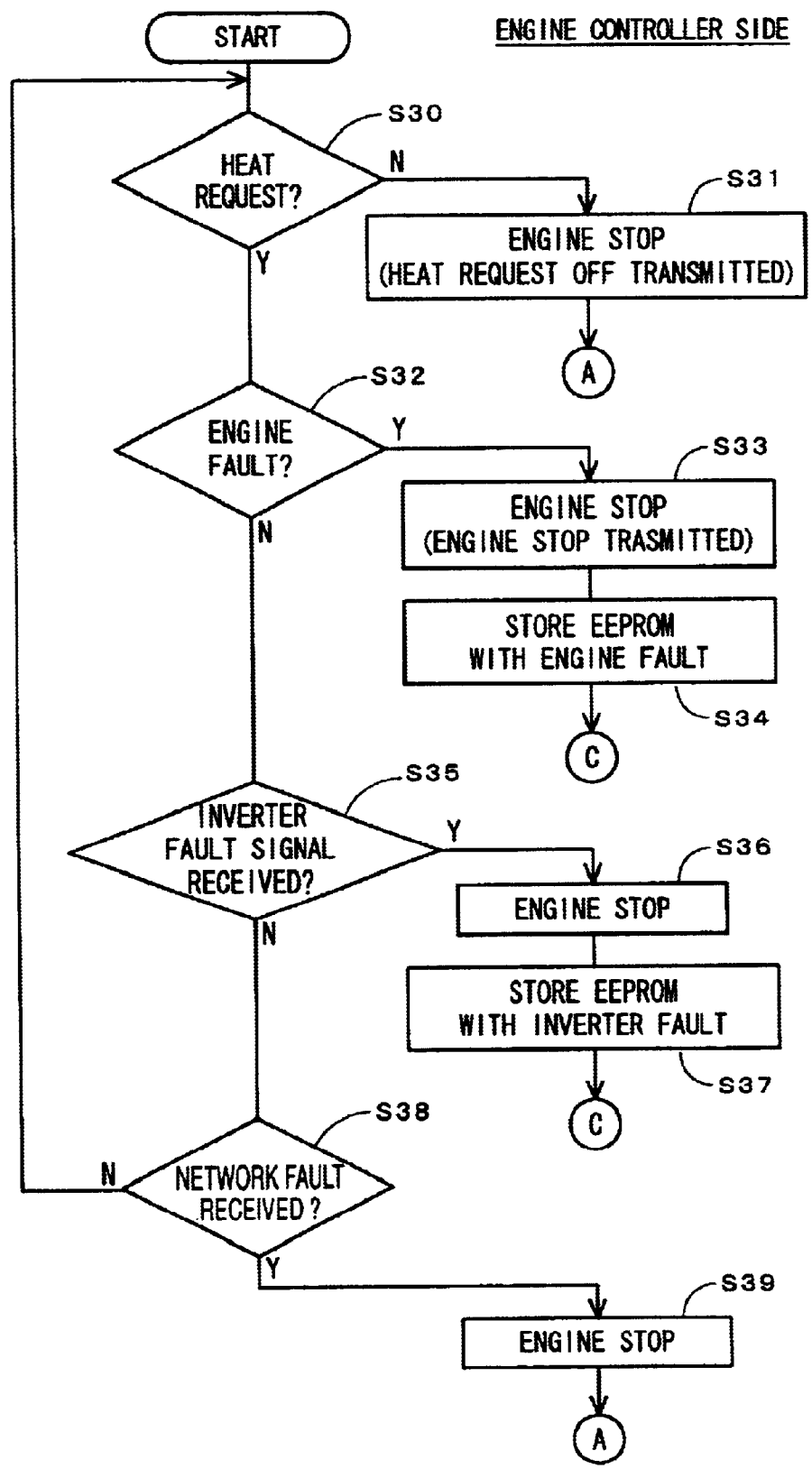
FIG. 4 is a flowchart showing the operation of the ECU when a fault occurs.

The procedure without the heat request or with the occurrence of a fault after the start up will be explained. FIG. 4 is a flowchart showing the process of the ECU 38. It is examined at Step S30 whether the heat request is received or not. If the request is not received, the procedure goes to Step S31 for stopping the engine 11. After stopping the engine 11, the procedure moves to Step S3 (FIG. 2) for waiting until the heat request is received. When the engine 11 is stopped with no heat request, its information is transferred to the inverter controller 13.

When the heat request is received, the procedure advances to Step S32 where it is examined whether the engine 11 has a fault or not. When the engine 11 has a fault, the procedure goes to Step S33 for stopping the engine 11. As the engine 11 stops, the nonvolatile memory is stored with the data of "engine fault" at Step S34 and then, the procedure moves back to Step S1. If the engine 11 is stopped by the fault on the engine 11, engine stop is transmitted to the inverter controller 13.

When the engine 11 has no fault, the procedure goes to Step S35. It is examined at Step S35 whether a fault signal indicative of a fault in the inverter unit 13 is received or not from the inverter controller 137. When the fault signal is received from of the inverter unit 13, the procedure moves to Step S36 for stopping the engine 11. Then, the nonvolatile memory is stored with a data of "inverter fault" at Step S37 and the procedure goes back to Step S1.

If the fault signal is not received from the inverter unit 13, the procedure goes to Step S38 where it is examined whether or not a signal indicative of power system fault is received or not from the inverter controller 137. When the power network fault signal is not received, the procedure moves to Step S30. When the signal indicative of power system fault is received, the procedure moves to Step S39 for stopping the engine 11 and the procedure returns to Step S3.

Figure 5:
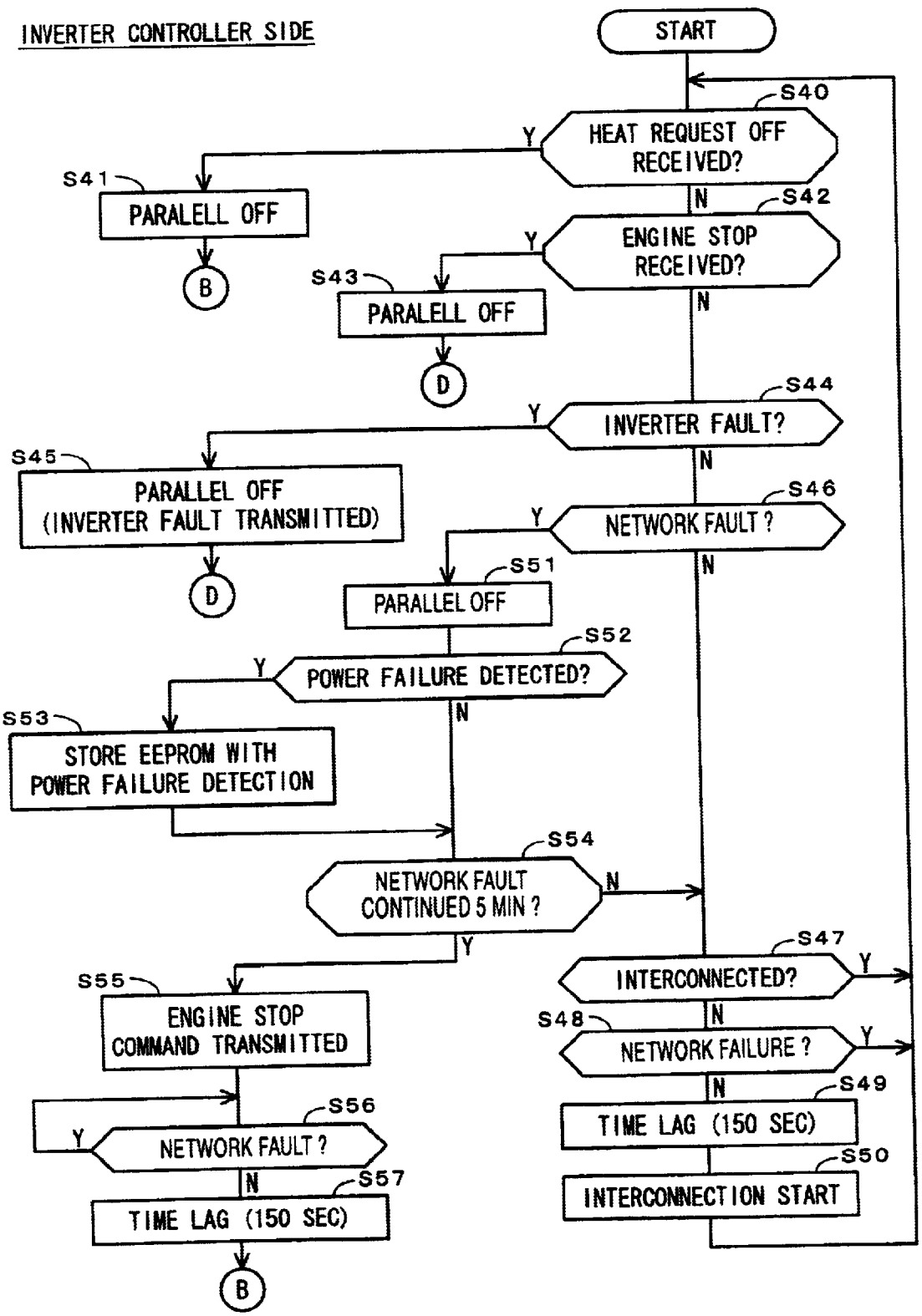
FIG. 5 is a flowchart showing the operation of the inverter controller when a fault occurs.

The process of the inverter controller 13 will now be explained referring to FIG. 5. It is examined at Step S40 whether or not the heat request off is received from the ECU 38. When the heat request off is received, the connection to the power network is released at Step S41 and the procedure moves back to Step S12 (FIG. 3). When the heat request off is not received, the procedure advances to Step S42 where it is examined whether or not the signal of the engine stop is received. When signal of the engine stop is received, the parallel operation is released at Step S43 and the procedure returns to Step S12. If the signal of the engine stop is not received, it is examined at Step S44 whether or not the inverter unit 13 has a fault. When the unit 13 has a fault, the procedure goes to Step S45 for releasing the connection to the commercial power network and the procedure moves back to Step S12.

If the inverter unit 13 has no fault, it is then examined at Step S46 whether or not the power system has a fault. When the power system has no fault, the procedure goes to Step S47 where it is examined whether or not the connection or parallel operation is established. When the parallel operation is established, the procedure returns back to Step S40.

When it is judged at Step S46 that the power network has a fault, the procedure goes to Step S51 for releasing the parallel operation of the systems. It is then examined at Step S52 whether or not a power failure occurs. When the power failure is detected, the nonvolatile memory is stored with the data indicative of the detection of the failure at Step S53. If no power failure is detected, the procedure skips Step S53 and jumps to the Step S54. It is then examined at Step S54 whether or not the power network fault continues throughout a predetermined length of time (e.g. five minutes). If Step S54 is negative, the procedure goes to Step S47. When the parallel operation is not established, the procedure advances to Step S48 where it is examined whether or not the power network has a fault. When the power network has a fault, the procedure moves back to Step S40. If not, the procedure goes to Step S49 for providing a time lag of a predetermined length of time (e.g., 150 seconds) and then to Step S50. At Step S50, the parallel operation is started. When the fault continues over the predetermined length of time, the procedure goes to Step S55 where the command of stopping the engine 11 is transmitted to the ECU 38. It is then examined at Step S56 whether or not the power network has a fault. When the fault has been eliminated, the procedure goes to Step S57 for providing a time lag of a predetermined length of time (e.g., 150 seconds) and then returned to Step S12 (FIG. 3).

Figure 6:
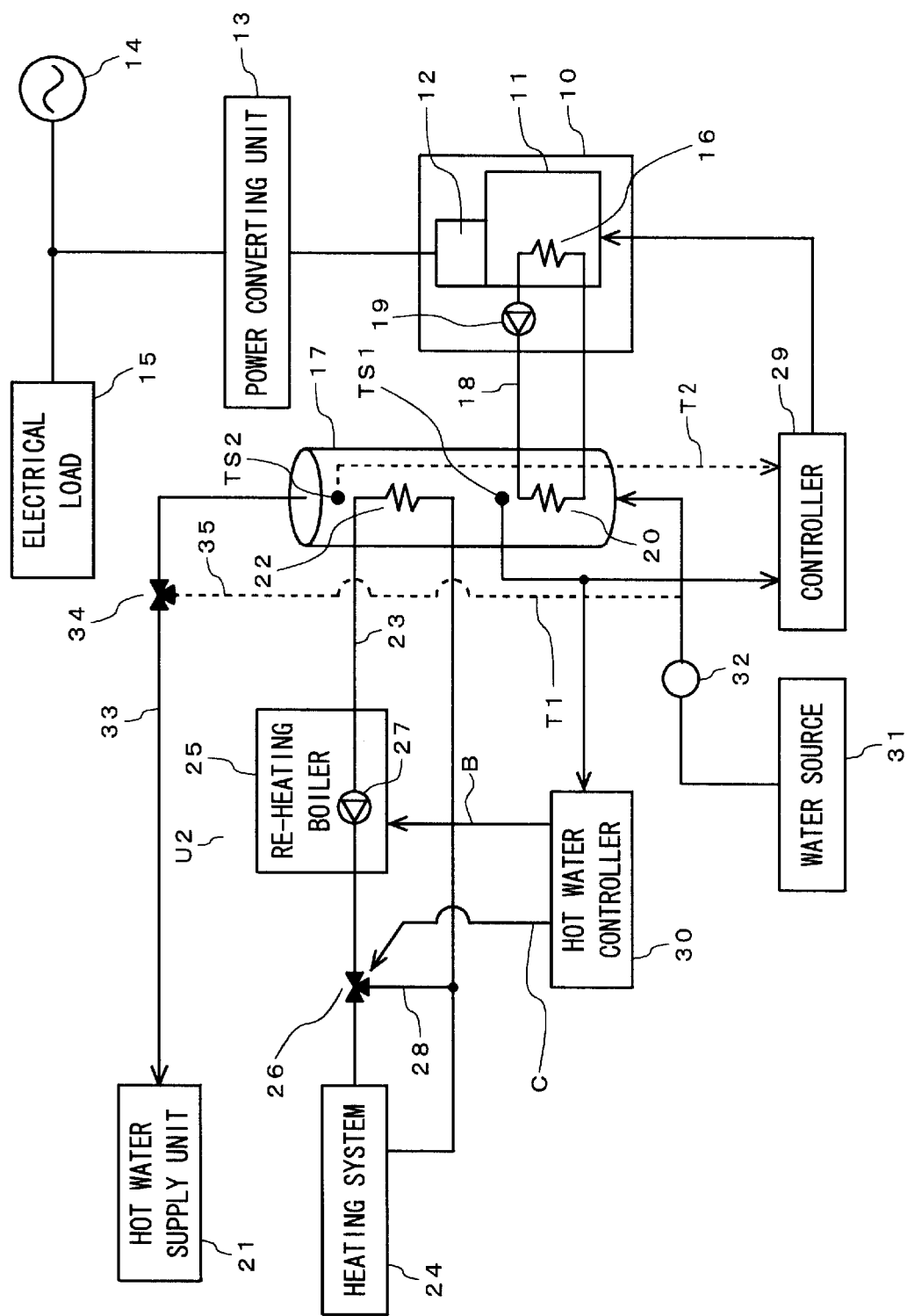
FIG. 6 is a block diagram of a cogeneration system illustrating another embodiment of the present invention.

A cogeneration system according to the present invention will be described which include an apparatus for utilizing heat of the exhaust gas from the engine generator. FIG. 6 is a block diagram of the cogeneration system where like components are denoted by like numerals as those shown in FIG. 1. As the engine 11 drives the generator 12, it generates heat which is recovered with a heat recovery unit 16 of the engine 11 through heat exchange. The recovery of heat may preferably be carried out on all the high-temperature regions of the engine 11 including a muffler tube. As the cooling water is carried through a tube 18 which extends across the heat recovery unit 16, it serves as a medium for conveying the heat to a hot-water storage tank 17.

The hot water storage tank 17 contains a output heat exchanger (referred to as a first heat exchanger hereinafter) 20 communicated with the conduit 18. The water supplied from a water source 31 to the hot water storage tank 17 is then heated by the first heat exchanger 20 to turn to a hot water. The hot water heated and saved in the hot water storage tank 17 is fed for further use to a hot water supply unit 21, which is a first thermal load.

A second heat exchanger 22 is provided above the first heat exchanger 20 in the tank 17. The second heat exchanger 22 is communicated to a conduit 23, which in turn connected with a heating system 24, such as a central heating system or a floor heating system, acting as a second thermal load. The second conduit 23 forms a second hot water path, which is separated from the hot water path for supplying the hot water from the hot water storage tank 17 to the hot water supply unit 21. The second hot water path 23 performs secondary exchange of the heat from the hot water storage tank 17 thus increasing the efficiency of the heat recovery.

In the second hot water path 23, there are also provided a re-heating boiler 25 and a three-directional valve 26. The re-heating boiler 25 is provided with a pump 27 for circulating the hot water throughout the second hot water path 23. The three-directional valve 26 is a means for switching the flow of the hot water to a bypass 28 or to the heating system 24. The following passages are selected by operating the three-directional valve 26. When the three-directional valve 26 is switched to the heating system 24, the passage is opened for conveying the hot water via the re-heating boiler 25 and the heating system 24 from and to the hot water storage tank 17. When the three-directional valve 26 is switched to the bypass 28, the passage is opened for conveying the hot water via the bypass 28, not the heating system 24, from and to the hot water storage tank 17.

A temperature sensor TS1 is provided in the hot water storage tank 17 and information about the temperature TI of the hot water measured by the temperature sensor TS1 is transmitted to a controller 29. The temperature sensor TS1 may be located at an appropriate height level between substantially the uppermost of the first heat exchanger 20 and the lowermost of the second heat exchanger 22 and most preferably at a midway between the first heat exchanger 20 and the second heat exchanger 22. It is very likely that, due to the effect of convection, the temperature of the hot water is lower at substantially the lowermost of the hot water storage tank 17 and higher at substantially the uppermost. As the temperature sensor TS1 is located at the midway, it can detect an average value of the temperature in the hot water storage tank 17.

In response to the temperature information TI, the controller 29 controls the start and stop operation of the engine 11. Because the temperature information TI represents the demand of heat from the hot water supply unit 21 which draws the hot water directly from the hot water storage tank 17 or from the heating system 24 which draws the hot water indirectly via the second heat exchanger 22, the controller 29 judges that the demand exceeds when the temperature information TI is not higher than a reference level Tref-1 and drives the engine 11 to generate the heat. On the other hand, when the temperature information TI is higher than the reference level Tref-1, the controller 29 judges that a sufficient level of the heat energy is saved in the hot water storage tank 17 and turns the heat request off then stops the engine 11.

The reference level Tref-1 of the temperature is determined from multiple parameters of the type and the magnitude of the thermal load (i.e. the type and the capacity of the hot water supply unit 21 and the heating system 24), the thermal output of the engine operated generator 10, the volume of the hot water storage tank 17, and so on. The reference level Tref-1 has a hysteresis for ensuring a stable operation of the engine 11, i.e., avoiding frequent start and stop operations.

In case that the engine 11 is controlled with the temperature information TI, its operation may be contemplated for driving the generator 12 to generate a constant power output or, in an electrical load dependent mode, to generate a variable output depending on the magnitude of the electrical load 15. In the constant power output mode, the engine 11 as a driving power source is operated to make the number of its revolutions constant and thus its operation will ensure a higher level of the efficiency minimizing the consumption of fuel and releasing an acceptable level of the exhaust gas. If the demand of electricity exceeds the output of the generator 12, a deficiency in the electricity is covered by the supply from the commercial power system 14.

The temperature of the hot water in the hot water storage tank 17 is significantly varied depending on the consumption of the hot water, i.e., the demand of thermal energy, and the mode of the operation of the engine operated generator 10, e.g., either the constant output mode or the electrical load dependent mode. For example, in a system where when the consumption of the hot water is low, the temperature of the hot water can be maintained to about 80° C. with the generator 12 operating in response to the temperature detected by the temperature sensor TS 1, either abrupt, bulky consumption of the hot water resulting from the demand of heat given simultaneously from both the hot water supply unit 21 and the heating system 24 or the startup of the system may cause the temperature of the hot water in the hot water storage tank 17 to drop down to as a low degree as of the cool water supplied.

In case that the reference temperature of the hot water in the hot water storage tank 17 is hardly maintained with the heat collected from the engine 11, the re-heating boiler 25 functions effectively. The hot water controller 30 provides the re-heating boiler 25 and the three-directional valve 26 with a command "B" for re-heating and a command "C" for switching, respectively. The hot water controller 30 is preset with a lower reference temperature Tref-L which is lower than the reference temperature Tref-1 and when the temperature T1 of the hot water in the hot water storage tank 17 drops down to lower than the lower reference temperature Tref-L, it turns on the re-heating command "B" and the switching command "C". As the re-heating command "B" is turned on, the re-heating boiler 25 starts operating. As the switching command "C" is turned on, the three-directional valve 26 shifts its passage to the bypass 28. Accordingly, the hot water heated by the re-heating boiler 25 circulates through the conduit 23 and increases the temperature of the hot water in the hot water storage tank 17 via the second heat exchanger 22.

A second temperature sensor TS2 is provided above the temperature sensor TS1. When the temperature T1 is below the reference temperature Tref-1 or the temperature T2 outputted by the temperature sensor TS2 is not higher than a reference temperature Tref-2 (>Tref-1), the controller 29 may generate and transfer the heat request to the ECU 38.

When the temperature T1 outputted by the temperature sensor TS1 exceeds a reference temperature Tref-3 (e.g. 70° C.) which is higher than the reference temperature Tref-1, the operation of the engine operated generator 10 is stopped. It is judged that the energy of heat stored in the hot-water storage tank 17 is sufficient as expressed by the temperature T1 outputted by the temperature sensor TS1 which reaches the reference temperature Tref-3.

A procedure of controlling the start/stop operation of the engine operated generator 10 based on the scale of a thermal load represented by the temperature of water in the hot water storage tank 17 is depicted in the specification of Japanese Patent Application (Heisei)11-106296 that is filed by this applicant.

Figure 7:
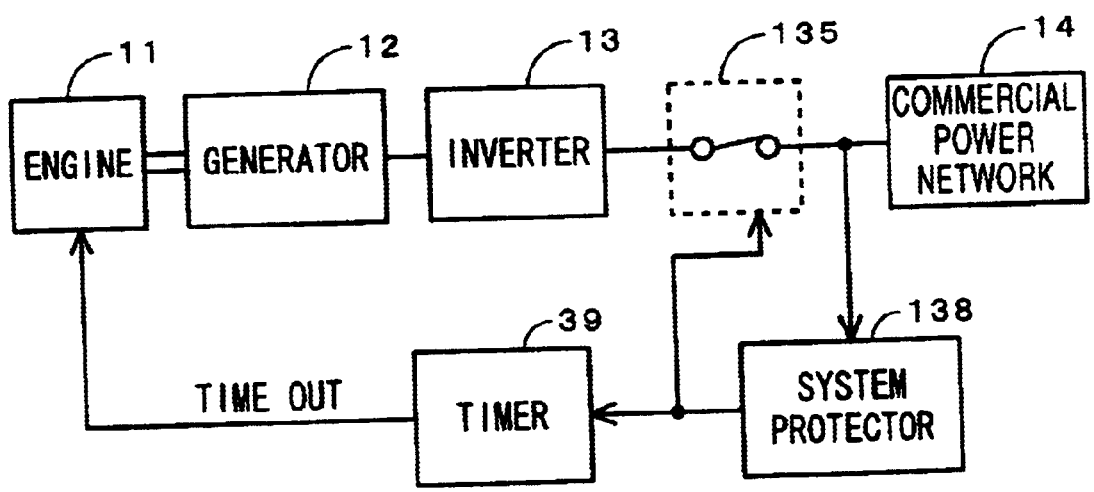
FIG. 7 is a block diagram of a primary part of a conventional engine generator apparatus.

FIG. 7 is a block diagram illustrating a primary part of the present invention. As shown, a system protector 138 generates a fault signal when detecting a fault in the system source from the voltage and frequency of the power system. Upon receiving the fault signal, a connector relay 135 is opened to cancel the interconnection to the power system and simultaneously a timer 39 is switched on. As the interconnection is canceled, the engine 11 runs with no load. When the fault signal continues until the setting duration (five minutes at Step S54) of the timer 39 is timed up, a time-out signal is released. Upon receiving the time-out signal, the engine 11 stops. When the fault signal is eliminated by removing the cause of the fault before the setting duration of the timer 39 is consumed, the connector relay 135 is closed to establish the interconnection again and the timer 39 is reset.

As set forth above, the features of the present invention allow the engine to continue its motion even if the interconnection is canceled and resumed within a short interval of time, thus minimizing loads exerted on the startup device. Also, as the warming up for activating the oxygen density sensor which is always carried out after the engine is stopped has to be performed at less frequencies, hence avoiding declination in the operational efficiency.

According to the feature of the present invention, the engine is started in response to a heat request received from the waste heat utilizing means, thus permitting the waste heat produced during the period before the activation of the oxygen density sensor is completed to be utilized at maximum effectiveness.

What is claimed is:

1. An engine generator apparatus for interconnecting an output of a generator driven by an engine with a power network, comprising:

an oxygen density sensor provided on the engine for controlling the air-fuel ratio based on its output;

a means for interconnecting the output of the power generator with the power network when the oxygen density sensor is in its activated state after the engine has started;

a fault detecting means for detecting a fault in the interconnection with the power network;

a means for canceling the interconnection with the power network without stopping the engine when the fault detecting means detects a fault, and resuming the interconnection with the power network when the fault is removed; and a means for stopping the engine when the interconnection is canceled for a predetermined length of time due to the fault detection.

2. A cogeneration system comprising:

an engine generator apparatus for interconnecting an output of a generator driven by an engine with a power network comprising:

an oxygen density sensor provided on the engine for controlling the air-fuel ratio based on its output;

a means for interconnecting the output of the power generator with the power network when the oxygen density sensor is in its activated state;

a fault detecting means for detecting a fault in the interconnection with the power network;

a means for canceling the interconnection with the power network when the fault detecting means detects a fault, and resuming the interconnection with the power network when the fault is removed;

a means for stopping the engine when the interconnection is canceled for a predetermined length of time due to the fault detection; and a waste heat utilizing unit for utilizing waste heat produced by the operation of the engine generator apparatus, wherein the engine is started in response to a heat request generated by the waste heat utilizing unit.

3. A cogeneration system according to claim 2, wherein the waste heat utilizing unit comprises:
- a hot-water tank for storing a first hot water heated with the waste heat released from the engine generator apparatus;
- a first heat exchanger installed in the hot-water tank for generating the first hot water;
- a second heat exchanger positioned above the first heat exchanger in the hot-water tank for heating the first hot water to a second hot water hotter than the first hot water using the heat of the first hot water;
- a temperature sensor provided in proximity between the upper end of the first heat exchanger and the lower end of the second heat exchanger; and
- a controller arranged responsive to an output of the temperature sensor for generating and supplying the heat request to the engine generator apparatus.

* * * * *